United States Patent [19]

Lukach et al.

[11] Patent Number: 4,604,217

[45] Date of Patent: Aug. 5, 1986

[54] GELLED AQUEOUS COMPOSITIONS

[75] Inventors: Carl Lukach; Shao-Tang Sun, both of New Castle County, Del.

[73] Assignee: Hercules Incorporated, Wilmington, Del.

[21] Appl. No.: 650,386

[22] Filed: Sep. 13, 1984

[51] Int. Cl.$^4$ .................... E21B 43/26; E21B 33/138
[52] U.S. Cl. ................ 252/8.55 1; 523/130; 523/402; 523/409; 523/411; 523/412
[58] Field of Search .............. 523/411, 414, 418, 130, 523/409, 412, 402; 252/8.55 R; 166/308

[56] References Cited

U.S. PATENT DOCUMENTS

| | | | |
|---|---|---|---|
| 3,700,623 | 10/1972 | Keim | 260/80.3 |
| 3,833,531 | 9/1974 | Keim | 260/29.6 |
| 4,018,286 | 4/1977 | Gall et al. | 166/295 |
| 4,033,415 | 7/1977 | Holtmyer et al. | 252/8.55 X |
| 4,043,921 | 8/1977 | Hessert et al. | 252/8.5 |
| 4,110,230 | 8/1978 | Hessert et al. | 252/8.55 |
| 4,110,231 | 8/1978 | Swanson | 252/8.55 X |
| 4,409,110 | 10/1983 | Borchardt et al. | 252/8.55 |
| 4,487,866 | 12/1984 | Almond et al. | 252/8.55 X |

*Primary Examiner*—Herbert B. Guynn
*Attorney, Agent, or Firm*—Joanna L. Horn

[57] ABSTRACT

Disclosed are gelled aqueous compositions having (1)(a) a water thickening amount of an anionic or nonionic water soluble polymer in fresh water or brine solutions at a pH of greater than 10; (b) a water thickening amount of an anionic water soluble polymer having carboxylate functionality and a cellulose backbone in brine solutions at an acidic pH; or (c) a water thickening amount of (i) an anionic water soluble polymer having carboxylate functionality and a cellulose backbone or (ii) a copolymer of sodium acrylate having from about 10% to about 90% acrylate content, in brine solutions at neutral to about 10 pH; and (2) a water soluble cationic poly(diallylamine)-epichlorohydrin resin in an amount sufficient to cause gelation and form the gelled composition. The compositions are useful in the recovery of oil and gas by fracturing and as a matrix plugging agent in enhanced oil recovery.

16 Claims, No Drawings

GELLED AQUEOUS COMPOSITIONS

This invention relates to gelled aqueous compositions comprising either an anionic water soluble polymer or a nonionic water soluble polymer, and a water soluble cationic poly(diallylamine)-epihalohydrin resin useful in the recovery of oil and gas by fracturing and as a matrix plugging agent in enhanced oil recovery.

Oil and gas are generally found in porous or permeable subterranean formations. Once penetrated, oil and gas contained in the pore spaces is displaced into the wellbore by a variety of known methods. However, the production of the oil and gas may be impaired due to the plugging of the channels through which the oil and gas must flow to the wellbore by drilling fluids or as a result of insufficient flow channels to carry the oil and gas to the wellbore. Such well formations are said to have low permeability.

An established method used today to stimulate the production of oil from a well having low permeability is fracturing with a hydraulic fracturing fluid. This technique comprises the injection of a suitable fracturing fluid into the formation under sufficient pressure to fracture the formation. The resulting fracture provides passageways to facilitate the flow of the oil and gas into the wellbore. The principal ingredients of current fracturing fluids are water soluble polymers and polyvalent metal salts and metal complexes of organic compounds. The polyvalent metal ion crosslinks the water soluble polymer to form a crosslinked polymer gel. Typically propping agents are included in the fracturing fluid to maintain the fracture in a propped condition when the pressure is relieved. This crosslinked polymer gel suspends the sand, walnut shell fragments, glass beads, aluminum pellets, or other propping agent as the fluid moves into the fracture. Usually propping agents have particle sizes from about 8-40 mesh (U.S. Sieve).

During the injection of fluid into the well formation, the fracturing fluid must have and must maintain the properties necessary to give fractures of reasonable lengths and widths. This is referred to as the fluid efficiency of the fracturing fluid. Such properties are related to the fluid loss characteristics and the viscosity of the particular fluid used. One way to minimize the loss of water to the walls of the wellbore and the fracture is to increase the viscosity of the fracturing fluid.

The use of gelled polymer solutions to improve the fracturing fluid efficiency has been taught. See, for example, U.S. Pat. No. 4,018,286. Further, the use of blends of polymers to increase the solution viscosities has been reported. U.S. Pat. No. 4,043,921, for example, teaches the use of blends of cellulose ethers and polyacrylamides to produce a matrix plugging gel having improved gel strength. Likewise, the use of synergistic mixtures of nonionic water soluble polymers and cationic organic polymers to reduce the solution viscosity thereby increasing the injectivity profiles of the fracturing solution in low permeability formations is taught in U.S. Pat. No. 4,409,110.

The gelled compositions of this invention can also be used as plugging agents in enhanced oil recovery.

The length of time which a crosslinked gel polymer solution can maintain its integrity depends on the depth of the well and on the thermal stability of the gel at that depth. The temperature of the well formation varies as a function of depth. The deeper the well, the higher the temperature at the bottom of the well. For example, the typical temperature range of the bottom of a well 2,000 feet deep is 89°-91° F., whereas a well 10,000 feet deep generally has a bottom hole temperature range of 141°-200° F. and a well 18,000 feet deep a bottom hole temperature range of 199°-385° F. At the present time, most wells drilled are under 10,000 feet in depth.

The thermal stability of a crosslinked polymer gel depends on the strength of the crosslinking bonds and on the stability of the polymer backbone to degradation. One way to strengthen the crosslinking bonds is to use crosslinking agents which bond to the polymer backbone by convalent bonding rather than the usual metal coordinate bonding.

This invention provides gelled aqueous compositions having (1)(a) a water thickening amount of an anionic or nonionic water soluble polymer in fresh water or brine solutions at a pH of greater than 10; (b) a water thickening amount of an anionic water soluble polymer having carboxylate functionality and a cellulose backbone in brine solutions at an acidic pH; or (c) a water thickening amount of (i) an anionic water soluble polymer having carboxylate functionality and a cellulose backbone or (ii) a copolymer of sodium acrylate having from about 10% to about 90% acrylate content, in brine solutions at neutral to about 10 pH; and (2) a water soluble cationic poly(diallylamine)-epihalohydrin resin in an amount sufficient to cause gelation and form the gelled composition. Gel formation is believed to result from the covalent bonding of the cationic poly(diallylamine)-epihalohydrin resin to an anionic or nonionic water soluble polymer useful in this invention.

Suitable anionic polymers for use in this invention include the alkali metal salts of carboxymethyl cellulose (CMC), carboxymethyl hydroxyethylcellulose (CMHEC), carboxymethyl guar (CMG), carboxymethyl hydroxyethyl guar (CMHEG), carboxymethyl hydroxypropyl guar (CMHPG), and xanthan gum as well as copolymers of sodium acrylate having from about 10% to about 90% acrylate content, preferably about 10% to about 50%, most preferably about 10% to about 30%. Typically the carboxymethyl degree of substitution (D.S.) is from about 0.1 to about 1.5, preferably from about 0.1 to about 1.0, except CMC which is preferably from about 0.7 to about 0.9. D.S. is the average number of hydroxyl groups substituted per anhydroglucose unit of the cellulose molecule or per anhydrohexose unit of the guar molecule depending on which anionic polymer is used. Generally, the hydroxyethyl or hydroxypropyl molar substitution (M.S.) is from about 0.15 to about 3.0, preferably from about 1.0 to about 2.5, most preferably from 1.5 to about 2.5. M.S. is the average number of moles of ethylene oxide or propylene oxide, as the case may be, per anhydroglucose unit of the cellulose molecule or per anhydrohexose unit of the guar molecule. Suitable alkali metals include sodium and potassium. Sodium is the preferred alkali metal.

Methods of preparing these anionic polymers of cellulose and guar are well known in the art. See, e.g., Whistler, R. L. & BeMiller, J. N., *Industrial gums*, 310, 486-89, 649-72, 695-729 (2d Ed. 1973).

Xanthan gum is an anionic polysaccharide containing a carboxylate group in the polymer repeat unit which is available commercially. Xanthan gum is a microbial fermentation gum produced by the bacteria of the genus Xanthomonas campestris.

Suitable copolymers of sodium acrylate include sodium acrylate-acrylamide copolymers and sodium acrylate-methacrylamide copolymers. The sodium acrylate-acrylamide copolymer is preferred. Typically the molecular weight of such copolymers ranges from about 50,000 to about 30,000,000. The preparation of copolymers of sodium acrylate is well known in the art.

Nonionic polymers useful in the compositions of this invention include polyacrylamides, polyacrylonitrile, polyvinylpyrrolidone, copolymers of acrylamide, hydroxyethyl cellulose (HEC), methyl cellulose (MC), methylhydroxyethyl cellulose (MHEC), ethylhydroxyethyl cellulose (EHEC), hydroxypropyl hydroxyethyl cellulose (HPHEC), hydroxyethyl guar (HEG) and hydroxypropyl guar (HPG).

Nonionic acrylamide polymers and copolymers, polyacrylonitrile, polyacrylic acid and polyvinylpyrrolidone can be prepared by methods known in the art or they can be obtained commercially. Generally, these polymers have a molecular weight from about 50,000 to about 30,000,000.

The hydroxyethyl or hydroxypropyl M.S. of the cellulose and guar ethers is from about 0.15 to about 3.0, preferably 0.2 to about 2.5. The methyl and ethyl D.S. of these ethers typically ranges from about 0.1 to about 1.0.

Methods of preparing the HEC, MC, MHEC, EHEC, HPHEC, HEG and HPG are well known in the art, Whistler, R. L. & BeMiller, J. N., *Industrial Gums*, 310, 620–22, 652 (2d Ed. 1973).

Water soluble cationic poly(diallyamine)-epihalohydrin resins used in this invention typically have a molecular weight of from 100 to 20,000,000, preferably 50,000 to 10,000,000, most preferably 50,000 to 3,000,000. The activated form of these resins, which is at a pH of at least 8, are believed to have repeating polymer units of the formula:

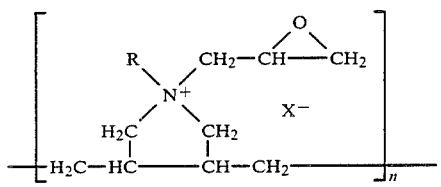

I or of the formula:

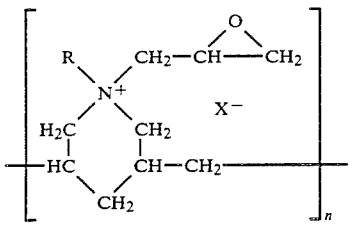

II where R is $C_{1-4}$ alkyl, X is a halide anion and n is an integer sufficient to provide a resin having a molecular weight from about 100 to about 20,000,000, or to be mixtures of I and II. There can also be some short chain branching in the repeat polymer units as a result of the ability of the epoxide group to chain out.

Examples of R include methyl, ethyl, propyl, isopropyl and butyl. Methyl is the preferred alkyl. Generally the halide anion is chloride or bromide. The preferred water soluble cationic resin for use in this invention is poly(N-methyldiallylamine)-epichlorohydrin.

At acidic pH, i.e. a pH of less than 5, the repeating units of the resins are believed to have the formula:

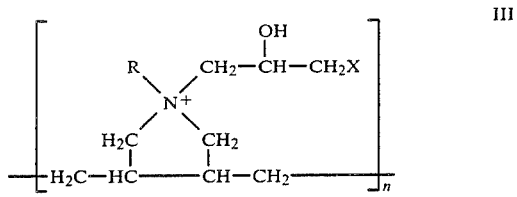

III or the formula:

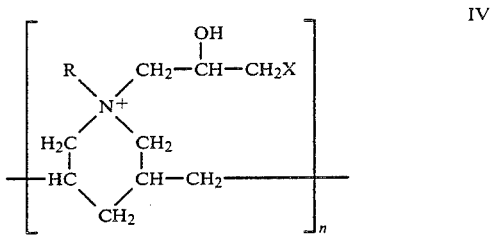

IV where R, X and n are as set forth above, or to be mixtures of III and IV.

The resins are prepared by polymerizing the hydrohalide salt of a diallylamine and reacting poly(diallylamine) thus formed with an epihalohydrin, particularly epichlorohydrin, by the methods of preparation known in the art. See, for example, the methods set forth in U.S. Pat. Nos. 3,700,623 and 3,833,531, the disclosures of which are incorporated by reference. The resulting solution of resin prior to dilution generally has a total solids content of about 20% to about 21%.

Poly(diallyamine)-epihalohydrin resin are prepared in aqueous solution at a pH of from about 7 to about 9.5 and the resins will contain units of the structures I or II above or both and has a tendency to gel on standing. The resin solution is stabilized against gelation by adding to the aqueous solution thereof sufficient acid, such as hydrochloric acid, to obtain and maintain the pH at about 2 and the resin will contain units of the structure III or IV or both. As such, the resins are referred to in the art as acid-stablizied resins, and are usually marketed in this form. The acid-stabilized resins are reactivated prior to use by known means to reestablish the I or II or both units. Such acid-stabilized resin solutions and means of reactivating same are disclosed in U.S. Pat. No. 3,833,531. The preferred means of reactivation is by addition of aqueous NaOH.

The compositions of this invention can be prepared for use as fracturing fluids at the surface in a suitable tank equipped with a suitable mixing means, and pumped down the wellbore into the formation using conventional equipment for such compositions. The compositions can also be prepared "on the fly", i.e. while being pumped down the well. In this case the anionic or nonionic polymer solution containing the proppant is prepared in a tank near the well head and pumping of the solution into the wellbore through a conduit is commenced. The solution of the cationic resin in its active form is prepared in a separate tank and is introduced into the aqueous solution stream of the anionic or nonionic polymer containing the proppant by a suitable connection a few feet downstream from the anionic or nonionic polymer mixing tank. The rate at which the components are introduced into the conduit will depend on the pumping rate of the particular composition of this invention and will be within the skill of those skilled in the art. Alternative methods for combining such fracturing fluid ingredients will also be known to those skilled in the art.

The compositions of this invention can also be mixed in solution at the surface to from dilute gels which are readily pumpable. The heat of the wellbore, particularly at the bottom of the wellbore, will activate the crosslinking reaction. For shallow fracturing, the composition or the separate polymer and resin solutions can be heated before pumping.

At a pH of greater than 10, all the anoionic and nonionic polymers useful in this invention form gels in both fresh and brine solutions.

Under acidic conditions, in brine solutions having a salt concentration of from about 1% to about 6%, only anionic water soluble polymers having carboxylate functionality and a cellulose backgone gel.

At neutral pH up to about pH 10 only the (1) anionic water soluble polymers having carboxylate functionality and a cellulose backbone gel at salt concentrations of from about 1% to about 5% and (2) copolymers of sodium acrylate with an ethylenically unsaturated monomer having about 10% to about 90% acrylate content gel at greater than 2% salt concentration.

Hence it can be seen that at certain pHs the salt concentration can be critical to gel formation.

The preferred polymer is CMHEC. This polymer forms gels with the cationic resins useful in this invention at all pHs in both fresh water and brine solutions.

The amount of anionic or nonionic polymer used in the practice of this invention can vary depending on the viscosity and purity of the polymer. In general, a water thickening amount, i.e. that amount which will significantly thicken the water to which it is added. Typically, this is from about 0.1% to about 1.0% preferably 0.4% to about 0.8%.

The concentration of the cationic resin will vary depending on the molecular weight of the resin. Usually from about 0.1 to about 1%, preferably 0.2% to about 0.4%

The following examples are illustrative of this invention. All parts and percentages used in this specification are by weight unless otherwise specified.

EXAMPLE 1

This example illustrates an embodiment of the gelled aqueous composition of this invention and how to prepare it.

A mixing vessel equipped with a stirrer is charged with 2 g. of a carboxymethyl hydroxyethyl cellulose having a carboxymethyl D.S. of 0.4 and a hydroxyethyl M.S. of 2.0 and, 4 g. of KCl in 200 g. of water. Stirring is commenced and continued throughout the preparation. The pH of the solution is adjusted to pH 6 by the addition of the appropriate reagent, i.e. either sodium hydroxide or hydrochloric acid.

An acid-stabilized solution of the poly(N-methyldiallylamine)-epichlorohydrin resin, 12 g, (5% solids) is activated in a separate container by adjusting the pH to 12 with sodium hydroxide solution. This is then added to the mix and stirred well at a temperature of 194° F. A gel formed in 20 min. and has a storage modulus (G') of 200 dynes/cm$^2$.

EXAMPLES 2–86

These examples illustrate other embodiments of the gelled aqueous compositions of this invention.

The procedure and formulation of Example 1 are used to prepare the compositions except that the formulation is changed as set forth in Tables I–V below.

TABLE I

| Example | Anionic Polymer | Anionic Polymer, % | Cationic Resin, % | KCl % | pH | Temp, °F. | Gel Time, Min |
|---|---|---|---|---|---|---|---|
| 2 | CMHEC (carboxy- | 0.5 | 0.3 | 2.0 | 3.0 | 77 | 600 |
| 3 | methyl D.S. | 1.0 | 0.3 | 0 | 3.0 | 77 | 600 |
| 4 | 0.4; hydroxy- | 1.0 | 0.3 | 2.0 | 3.0 | 77 | 600 |
| 5 | ethyl M.S. 2.0) | 1.0 | 0.3 | 2.0 | 3.0 | 194 | 15–45 |
| 6 | | 1.0 | 0.3 | 4.0 | 3.0 | 194 | 60–120 |
| 7 | | 1.0 | 0.3 | 1.0 | 8.0 | 77 | 600 |
| 8 | | 1.0 | 0.3 | 1.0 | 8.0 | 194 | 10–30 |
| 9 | | 1.0 | 0.3 | 2.0 | 8.0 | 194 | 10–30 |
| 10 | | 1.0 | 0.3 | 3.0 | 8.0 | 194 | 30–90 |
| 11 | | 1.0 | 0.3 | 0 | 12.0 | 77 | 30 |
| 12 | | 1.0 | 0.3 | 2.0 | 12.0 | 77 | 60–120 |
| 13 | | 1.0 | 0.3 | 4.0 | 12.0 | 77 | 600 |
| 14 | | 1.0 | 0.3 | 6.0 | 12.0 | 77 | 600 |
| 15 | | 1.0 | 0.3 | 3.0 | 12.0 | 194 | 5 |
| 16 | | 1.0 | 0.3 | 4.0 | 12.0 | 194 | 10–20 |
| 17 | | 1.0 | 0.3 | 5.0 | 12.0 | 194 | 30–40 |
| 18 | | 1.0 | 0.3 | 6.0 | 12.0 | 194 | 40–60 |
| Control | | | | | | | |
| 1 | CMHEC (carboxy- | 1.0 | 0.3* | 2.0 | 3.0 | 77 | No gel |
| 2 | methyl D.S. | 1.0 | 0.3* | 2.0 | 8.0 | 77 | No gel |
| 3 | 0.4; hydroxy-ethyl M.S. 2.0) | 1.0 | 0.3* | 2.0 | 12.0 | 77 | No gel |

*Poly(diallyldimethylamine), 43% solids.

TABLE II

| Example | Anionic Polymer | Anionic Polymer, % | Cationic Resin, % | KCl % | pH | Temp, °F. | Gel Time, Min |
|---|---|---|---|---|---|---|---|
| 19 | CMHEC (carboxy- | 0.5 | 0.3 | 2.0 | 3.6 | 77 | 600 |
| 20 | methyl D.S. | 0.5 | 0.3 | 4.0 | 3.1 | 77 | 600 |
| 21 | 0.8; hydroxy- | 0.5 | 0.3 | 2.0 | 7.1 | 77 | 600 |

TABLE II-continued

| Example | Anionic Polymer | Anionic Polymer, % | Cationic Resin, % | KCl % | pH | Temp, °F. | Gel Time, Min |
|---|---|---|---|---|---|---|---|
| 22 | ethyl M.S. | 0.5 | 0.3 | 2.0 | 12.0 | 77 | 240 |
| 23 | 0.5) | 1.0 | 0.3 | 2.0 | 3.1 | 77 | 600 |
| 24 | | 1.0 | 0.3 | 2.0 | 9.2 | 77 | 600 |
| 25 | | 1.0 | 0.3 | 2.5 | 7.0 | 77 | 600 |
| 26 | | 1.0 | 0.3 | 3.0 | 7.0 | 77 | 600 |
| 27 | | 1.0 | 0.3 | 0 | 11.0 | 77 | 120 |
| 28 | | 1.0 | 0.3 | 2.0 | 11.0 | 77 | 60 |
| 29 | | 1.0 | 0.3 | 0 | 12.0 | 77 | 120 |
| 30 | | 1.0 | 0.3 | 2.0 | 12.0 | 77 | 90 |
| 31 | | 1.0 | 0.3 | 2.0 | 8.1 | 194 | 20 |
| 32 | | 1.0 | 0.3 | 2.0 | 12.0 | 194 | 10 |
| 33 | | 1.0 | 0.3 | 3.0 | 12.0 | 194 | 10 |
| 34 | | 1.0 | 0.3 | 4.0 | 12.0 | 194 | 10 |
| 35 | | 1.0 | 0.3 | 5.0 | 12.0 | 194 | 10 |
| 36 | | 1.0 | 0.3 | 6.0 | 12.0 | 194 | 20 |
| 37 | | 1.0 | 0.3 | 3.0 | 8.0 | 194 | 30 |
| 38 | | 1.0 | 0.3 | 4.0 | 8.0 | 194 | 30 |
| 39 | | 1.0 | 0.3 | 5.0 | 8.0 | 194 | 30 |

TABLE III

| Example | Anionic Polymer | Anionic Polymer, % | Cationic Resin, % | KCl % | pH | Temp, °F. | Gel Time, Min |
|---|---|---|---|---|---|---|---|
| 40 | CMC (carboxy- | 0.5 | 0.3 | 3.0 | 3.0 | 77 | 600 |
| 41 | methyl D.S. | 0.5 | 0.3 | 4.0 | 3.0 | 77 | 600 |
| 42 | 0.9) | 1.0 | 0.3 | 2.0 | 3.0 | 77 | 600 |
| 43 | | 1.0 | 0.3 | 4.0 | 3.0 | 77 | 600 |
| 44 | | 1.0 | 0.3 | 6.0 | 3.0 | 77 | 600 |
| 45 | | 1.0 | 0.3 | 4.0 | 3.0 | 194 | 15–30 |
| 46 | | 1.0 | 0.3 | 0 | 12.0 | 77 | 600 |
| 47 | | 1.0 | 0.3 | 2.0 | 12.0 | 77 | 180 |
| 48 | | 1.0 | 0.3 | 4.0 | 12.0 | 77 | 120 |
| 49 | | 1.0 | 0.3 | 6.0 | 12.0 | 77 | 600 |
| 50 | | 1.0 | 0.3 | 3.0 | 12.0 | 194 | 20–30 |
| 51 | | 1.0 | 0.3 | 4.0 | 12.0 | 194 | 5 |
| 52 | | 1.0 | 0.3 | 5.0 | 12.0 | 194 | 5 |
| 53 | | 1.0 | 0.3 | 6.0 | 12.0 | 194 | 20 |
| 54 | CMHPG (carboxy- | 0.5 | 0.3 | 2.0 | 12.0 | 77 | 600 |
| 55 | methyl D.S. | 1.0 | 0.3 | 0 | 11.8 | 77 | 10 |
| 56 | 0.13; hydroxy- | 1.0 | 0.3 | 2.0 | 12.0 | 77 | 120 |
| 57 | propyl M.S. 0.19) | 1.0 | 0.3 | 2.0 | 11.9 | 194 | 5 |

TABLE IV

| Example | Anionic Polymer | Anionic Polymer, % | Cationic Resin, % | KCl % | pH | Temp, °F. | Gel Time, Min |
|---|---|---|---|---|---|---|---|
| 58 | CMHPG (carboxy- | 0.5 | 0.3 | 2.0 | 12.0 | 77 | 300 |
| 59 | methyl D.S. | 1.0 | 0.3 | 0.5 | 12.0 | 194 | 3 |
| 60 | 0.2; hydroxy- | 1.0 | 0.3 | 3.0 | 12.0 | 194 | 10 |
| 61 | propyl M.S. | 1.0 | 0.3 | 4.0 | 12.0 | 194 | 20–30 |
| 62 | 0.2) | 1.0 | 0.3 | 5.0 | 12.0 | 194 | 30–50 |
| 63 | | 1.0 | 0.3 | 6.0 | 12.0 | 194 | 120 |
| 64 | CMG (carboxy- | 1.0 | 0.3 | 2.0 | 3.0 | 77 | 600 |
| 65 | methyl D.S. 0.8) | 1.0 | 0.3 | 4.0 | 12.0 | 194 | 10–20 |
| 66 | | 1.0 | 0.3 | 5.0 | 12.0 | 194 | 20–30 |
| 67 | | 1.0 | 0.3 | 6.0 | 12.0 | 194 | 30–50 |
| 68 | CMG (carboxy- | 0.5 | 0.3 | 2.0 | 12.0 | 77 | 600 |
| 69 | methyl D.S. 0.2) | 1.0 | 0.3 | 3.0 | 12.0 | 194 | 5 |
| 70 | | 1.0 | 0.3 | 4.0 | 12.0 | 194 | 10–20 |
| 71 | | 1.0 | 0.3 | 5.0 | 12.0 | 194 | 30–40 |
| 72 | | 1.0 | 0.3 | 6.0 | 12.0 | 194 | 60 |
| 73 | Sodium acrylate- | 0.56 | 0.1 | 5.0 | 7.0 | 194 | 30 |
| 74 | acrylamide copolymer having 30% acrylate content | 0.56 | 0.1 | 5.0 | 10.0 | 194 | 30 |
| Control | | | | | | | |
| 4 | Sodium acrylate- | 0.56 | 0.5 | 0 | 3.0 | 77 | Ppt* |
| 5 | acrylamide copolymer having 30% acrylate content | 0.56 | 0.1 | 5.0 | 3.0 | 77 | No gel |

*Precipitate formed.

TABLE V

| Example | Nonionic Polymer | Nonionic Polymer, % | Cationic Resin, % | KCl % | pH | Temp, °F. | Gel Time, Min |
|---|---|---|---|---|---|---|---|
| 73 | HPG (hydroxy- | 0.5 | 0.3 | 2.0 | 12.0 | 77 | 600 |
| 74 | propyl M.S. | 1.0 | 0.3 | 0 | 12.0 | 77 | 120 |
| 75 | 0.25) | 1.0 | 0.3 | 2.0 | 12.0 | 77 | 600 |
| 76 | | 1.0 | 0.3 | 4.0 | 12.0 | 77 | 600 |
| 77 | | 1.0 | 0.3 | 10.0 | 12.0 | 77 | 600 |
| 78 | | 1.0 | 0.3 | 0 | 11.1 | 77 | 600 |
| 79 | | 1.0 | 0.3 | 2.0 | 11.9 | 194 | 90–120 |
| 80 | HEC (hydroxyl- | 0.5 | 0.3 | 2.0 | 12.0 | 77 | 600 |
| 81 | ethyl M.S. 2.5) | 1.0 | 0.3 | 0 | 12.0 | 77 | 120 |
| 82 | | 1.0 | 0.3 | 2.0 | 12.0 | 77 | 600 |
| 83 | | 1.0 | 0.3 | 4.0 | 12.0 | 77 | 600 |
| 84 | | 1.0 | 0.3 | 10.0 | 12.0 | 77 | 600 |
| 85 | | 1.0 | 0.3 | 0 | 11.0 | 77 | 600 |
| 86 | | 1.0 | 0.3 | 2.0 | 11.9 | 194 | 180 |
| Control | | | | | | | |
| 6 | HEC (hydroxyl- | 1.0 | 0.3* | 2.0 | 8 | 77 | No gel |
| 7 | ethyl M.S. 2.5) | 1.0 | 0.3* | 2.0 | 12.0 | 77 | No gel |

*Poly(diallyldimethylamine), 43% solids.

The aqueous gelled compositions have good thermal stability as indicated by their high thermal breakdown temperatures, $T_B$, and by their storage modulus, $G'$. $G'$ is a measure of gel strength. A strong gel has a storage modulus of about 100 dynes/cm$^2$. A weak gel has a storage modulus of about 10 dynes/cm$^2$. Representative $T_B$ and $G'$ for gels formed with certain anionic polymers at pH 3 and pH 12 and for gels formed with nonionic polymers at pH 12 are shown in Table VI below.

TABLE VI

| Example No. | $T_B$, °F. | $G'$, dynes/cm$^2$ |
|---|---|---|
| 23 | 203 | 300 |
| 30 | 380 | 400 |
| 75 | 360 | 450 |
| 82 | 392 | 500 |

Thus, this invention provides aqueous gelled compositions having high temperature stability useful in fracturing fluids for the recovery of oil and gas from well formations. The gels are also useful as plugging agents in enhanced oil recovery and in other gas and oil recovery operations.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. A gelled aqueous composition comprising fresh water or brine having a pH greater than 10 and
   (a) a water thickening amount of (i) an anionic water soluble polymer selected from the group consisting of alkali metal salts of carboxymethyl cellulose, carboxymethyl hydroxyethylcellulose, carboxymethyl guar, carboxymethyl hydroxyethyl guar, carboxymethyl hydroxypropyl guar, xanthan gum and copolymers of sodium acrylate having a molecular weight of from about 50,000 to about 30,000,000 and from about 10% to about 90% acrylate content or (ii) a nonionic water soluble polymer selected from the group consisting of polyacrylamides having a molecular weight of from about 50,000 to about 30,000,000, polyacrylontrile having a molecular weight of from about 50,000 to about 30,000,000, polyvinylpyrrolidone having a molecular weight of from about 50,000 to about 30,000,000, copolymers of acrylamide having a molecular weight of from about 50,000 to about 30,000,000, hydroxyethyl cellulose, methyl cellulose, methylhydroxyethyl cellulose, ethylhydroxyethyl cellulose, hydroxypropyl hydroxyethyl cellulose, hydroxyethyl guar and hydroxypropyl guar, and
   (b) a water soluble cationic poly(diallylamine)-epichlorohydrin resin having a molecular weight from about 100 to about 20,000,000 in an amount sufficient to cause a gel to form.

2. The composition of claim 1 wherein (a) is present in an amount from about 0.1% to about 1%.

3. The composition of claim 1 wherein (b) is present in an amount from about 0.1% to about 1%.

4. The composition of claim 1 wherein (a) is a copolymer of sodium acrylate having a molecular weight of from about 50,000 to about 30,000,000 and from about 10% to about 30% acrylate content.

5. A gelled aqueous composition comprising a brine solution having an acidic pH and
   (a) a water thickening amount of an anionic water soluble polymer having carboxylate functionality and a cellulose backbone selected from the group consisting of alkali metal salts of carboxymethyl cellulose and carboxymethyl hydroxyethylcellulose, and
   (b) a water soluble cationic poly(diallylamine)-epichlorohydrin resin having a molecular weight of from about 100 to about 20,000,000 in an amount sufficient to cause a gel to form.

6. The composition of claim 5 wherein the brine solution has a salt concentration of from about 1% to about 6%.

7. The composition of claim 5 wherein (a) is present in an amount from about 0.1% to about 1%.

8. The composition of claim 5 wherein (b) is present in an amount from about 0.1% to about 1%.

9. A gelled aqueous composition comprising a brine solution having a pH of from neutral to about 10
   (a) a water thickening amount of (i) an anionic water soluble polymer having carboxylate functionality and a cellulose backbone selected from the group consisting of alkali metal salts of carboxymethyl cellulose and carboxymethyl hydroxyethylcellulose or (ii) a copolymer of sodium acrylate having a molecular weight of from about 50,000 to about 30,000,000 and from about 10% to about 90% acrylate content, and (b) a water soluble cationic poly(diallylamine)-epichlorohydrin resin having a molecular weight of from about 100 to about 20,000,000 in an amount sufficient to cause a gel to form.

10. The composition of claim 9 wherein (a) is a copolymer of sodium acrylate having a molecular weight of from about 50,000 to about 30,000,000 and from about 10% to about 30% acrylate content.

11. The composition of claim 9 wherein (a) is present in an amount from about 0.1% to about 1%.

12. The composition of claim 9 wherein (b) is present in an amount from about 0.1% to about 1%.

13. The composition of claim 9 wherein the brine solution has a salt concentration of from about 1% to about 5%.

14. The composition of claim 9 wherein the brine solution has a salt concentration of greater than 2%.

15. The composition of claim 14 wherein (a) is a copolymer of sodium acrylate having from about 10% to about 90% acrylate content.

16. The composition of claim 15 wherein the acrylate content is from 10% to about 50%.

* * * * *